US008271502B2

(12) United States Patent
Svore et al.

(10) Patent No.: US 8,271,502 B2
(45) Date of Patent: Sep. 18, 2012

(54) PRESENTING MULTIPLE DOCUMENT SUMMARIZATION WITH SEARCH RESULTS

(75) Inventors: Krysta Marie Svore, Seattle, WA (US); Jamil Amirali Valliani, Kirkland, WA (US); Deqing Chen, Issaquah, WA (US); Lucretia H. Vanderwende, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 228 days.

(21) Appl. No.: 12/492,930

(22) Filed: Jun. 26, 2009

(65) Prior Publication Data

US 2010/0332498 A1 Dec. 30, 2010

(51) Int. Cl.
*G06F 7/00* (2006.01)
(52) U.S. Cl. ........................................ 707/748
(58) Field of Classification Search ............... 707/748
See application file for complete search history.

(56) References Cited

U.S. PATENT DOCUMENTS

| | | |
|---|---|---|
| 2005/0203970 A1 | 9/2005 | McKeown |
| 2006/0167930 A1 | 7/2006 | Witwer |
| 2008/0222140 A1 | 9/2008 | Lagad |
| 2009/0216790 A1* | 8/2009 | Dexter .................. 707/102 |

FOREIGN PATENT DOCUMENTS

WO WO2007029207 A2 3/2007

OTHER PUBLICATIONS

CNN.com. 2007b. Nigeria reports first human death from bird flu. http://edition.cnn.com/2007/WORLD/africa/01/31/nigeria.bird.flu.ap/index.html?eref=edition world.
Efficient Summarization-Aware Search for Online News Articles http://www1.cs.columbia.edu/~gravano/Papers/2007/jcdl07.pdf.
NewsInEssence: A System for Domain-Independent, Real-Time News Clustering and Multi-Document Summarization http://acl.ldc.upenn.edu/H/H01/H01-1056.pdf.
Tracking and Summarizing News on a Daily Basis with Columbia's Newsblaster http://www1.cs.columbia.edu/~sable/research/hltblaster.pdf.
Using Signals of Human Interest to Enhance Single-document Summarization http://www.aaai.org/Papers/AAAI/2008/AAAI08-266.pdf.
Automatic Multi-Document Summarization for Digital Libraries http://dlist.sir.arizona.edu/1363/01/11.Ou_Shiyan_pp72-82_.pdf.

(Continued)

*Primary Examiner* — Apu Mofiz
*Assistant Examiner* — Ajith Jacob
(74) *Attorney, Agent, or Firm* — Shook Hardy & Bacon L.L.P.

(57) ABSTRACT

Methods and computer-readable media are provided for summarizing the content of a plurality of documents and presenting the results of such multiple-document summarization to a user in such a way that the user is able to quickly and easily discern what, if any, unique information each document contains. Each sentence of each document is assigned a score based upon the perceived importance of the information contained therein. The sentences receiving the highest scores are then compared with one another to identify and remove any duplicate sentences. The remaining high-scoring sentences are extracted from the corresponding documents and presented to the user, for instance, in a bulleted list format. The user can then simply scan the list and can quickly and easily discern the unique information contained in each document.

18 Claims, 6 Drawing Sheets

OTHER PUBLICATIONS

Multi-Document Summarization by Sentence Extraction http://courses.ischool.berkeley.edu/i256/f06/papers/goldstein00.
Description of the UAM System for Generating Very Short Summaries at DUC-2003 http://citeseerx.ist.psu.edu/viewdoc/download;jsessionid=DA5756729139CEB548164265FC66FAD6?doi=10.1.1.6.8502&rep=rep1&type=pdf.
Trainable, Scalable Summarization using Robust NLP and Machine Learning http://www.aclweb.org/anthology-new/P/P98/P98-1009.pdf.
Learning to Rank using Gradient Descent http://research.microsoft.com/en-us/um/people/cburges/papers/icml_ranking.pdf.
Learning to Rank with Nonsmooth Cost Functions http://net.pku.edu.cn/~course/cs410/reading/lambdarank.pdf.
Cable News Network; http://www.cnn.com.
Left-Brain/Right-Brain Multi-Document Summarization http://www.cs.umd.edu/~oleary/reprints/c32.pdf.
Large Scale Named Entity Disambiguation Based on Wikipedia Data http://acl.ldc.upenn.edu/D/D07/D07-1074.pdf.
Bayesian Multi Document Summarization at MSE http://www.isi.edu/~marcu/papers/daume05mse.pdf.
DUC. 2001. Document understanding conferences http://www-nlpir.nist.gov/projects/duc/index.html.
New Methods in Automatic Extracting https://eprints.kfupm.edu.sa/53107/1/53107.pdf.
Lexpagerank: Prestige in Multi-Document Text Summarization http://tangra.si.umich.edu/~radev/papers/emnlp04pos.pdf.
Lexrank: Graphbased Centrality as Salience in Text Summarization http://tangra.si.umich.edu/~radev/lexrank/lexrank.pdf.
WordNet: An Electronic Lexical Database http://www.dsoergel.com/cv/C19.pdf.
NTT's Text Summarization System for DUC-2002 http://209.85.229.132/search?q=cache:MRIN8BJDGhUJ:www-nlpir.nist.gov/projects/duc/pubs/2002papers/hirao_ntt.ps+Ntt%E2%80%99s+text+summarization+system+for+DUC%E2%80%932002&cd=1&hl=en&ct=clnk.
Query Independent Sentence Scoring Approach to DUC 2006 http://www-nlpir.nist.gov/projects/duc/pubs/2006papers/IIITH_DUC2006_2.pdf.
Using Hidden Markov Modeling to Decompose Human-Written Summaries http://acl.ldc.upenn.edu/J/J02/J02-4006.pdf.
A Trainable Document Summarizer http://portal.acm.org/ft_gateway.cfm?id=215333&type=pdf&coll=GUIDE&dl=GUIDE&CFID=28008493&CFTOKEN=53759000.
Extract-Based Summarization with Simplification http://www.doc.ic.ac.uk/~srueger/pr-p.lal-2002/duc02-final.pdf.
Efficient backprop. http://www.springerlink.com/content/4w0bab2v3qnqhwyr/fulltext.pdf.
Automated Multi-Document Summarization in NeATS http://www.isi.edu/natural-language/projects/webclopedia/pubs/02hlt-neats.pdf.
Looking for a Few Good Metrics: Automatic Summarization Evaluation—How Many Samples are Enough? http://research.microsoft.com/en-us/people/cyl/ntcir4.pdf.
Rouge: A Package for Automatic Evaluation of Summaries http://law.kuleuven.be/icri/conferences/Lin.pdf.
The Automatic Creation of Literature Abstracts http://www.research.ibm.com/journal/rd/022/luhn.pdf.
Automatic Summarization http://www.benjamins.nl/cgi-bin/t_bookview.cgi?bookid=NLP%203.
Textgraphs: Graph-Based Methods for NLP http://www.textgraphs.org/ws06.
An algorithm for language independent single and multiple document summarization. http://www.cse.unt.edu/~rada/papers/mihalcea.ijcnlp05.pdf.
Language Independent Extractive Summarization http://portal.acm.org/ft_gateway.cfm?id=1225766&type=pdf&coll=GUIDE&dl=GUIDE&CFID=28008319&CFTOKEN=45269497.
A Compositional Context Sensitive Multi-Document Summarizer: Exploring the Factors that Influence Summarization http://research.microsoft.com/pubs/77523/fp285-nenkova.pdf.
Automatic Text Summarization of Newswire: Lessons Learned from the Document Understanding Conference http://www1.cs.columbia.edu/~ani/papers/AAAI051NenkovaA.pdf.
Building a Resource for Evaluating the Importance of Sentences http://citeseerxist.psu.edu/viewdoc/download?doi=10.1.1.59.9718&rep=rep1&type=pdf.
Web-Page Summarization Using Click-Through Data http://research.microsoft.com/pubs/69202/f359sun.pdf.
The Pythy Summarization System: Microsoft Research at DUC2007 http://duc.nist.gov/pubs/2007papers/microsoft.final.pdf.
Microsoft Research at Duc2006: Task-Focused Summarization with Sentence Simplification http://duc.nist.gov/pubs/2006papers/duc2006_MSR_final.pdf.
Wikipedia http://www.wikipedia.org.
Multi-Document Summarization by Maximizing Informative Content-Words http://www.aaai.org/Papers/IJCAI/2007/IJCAI07-287.pdf.

* cited by examiner

PRESENTING MULTIPLE DOCUMENT SUMMARIZATION WITH SEARCH RESULTS

BACKGROUND

Search results returned for a given query often include duplicate or largely repetitive information. For instance, a user searching for a news article on a given topic may be presented with a plurality of links to various articles about the topic, some of which may be exact duplicates of one another, for instance, because they are syndicated from a single source, or may have a substantial percentage of duplicate information, with only a small snippet of information differing from one article to another. It is often difficult for a user to parse through all the results and figure out what unique value each search result (e.g., news article) contains without viewing each result and scanning its content—a time-consuming and, at times, frustrating process.

SUMMARY

Embodiments of the present invention relate to methods and computer-readable media for, among other things, summarizing the content of a plurality of documents (e.g., search result documents) and presenting the results of such multiple-document summarization to a user in such a way that the user is able to quickly and easily discern what, if any, unique information each document contains. Each sentence of each document is assigned a score based upon the perceived importance of the information contained therein. The sentences receiving the highest scores are then compared with one another to identify and remove any duplicate (or substantially duplicate) sentences. The remaining high-scoring sentences are then extracted from the corresponding documents and presented to the user, for instance, in a bulleted list format. The user can then simply scan the list and, because duplicate and substantially duplicate sentences have been removed from presentation consideration, can quickly and easily discern the unique information contained in each document.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention are described in detail below with reference to the attached drawing figures, wherein.

DETAILED DESCRIPTION

Figure 1:
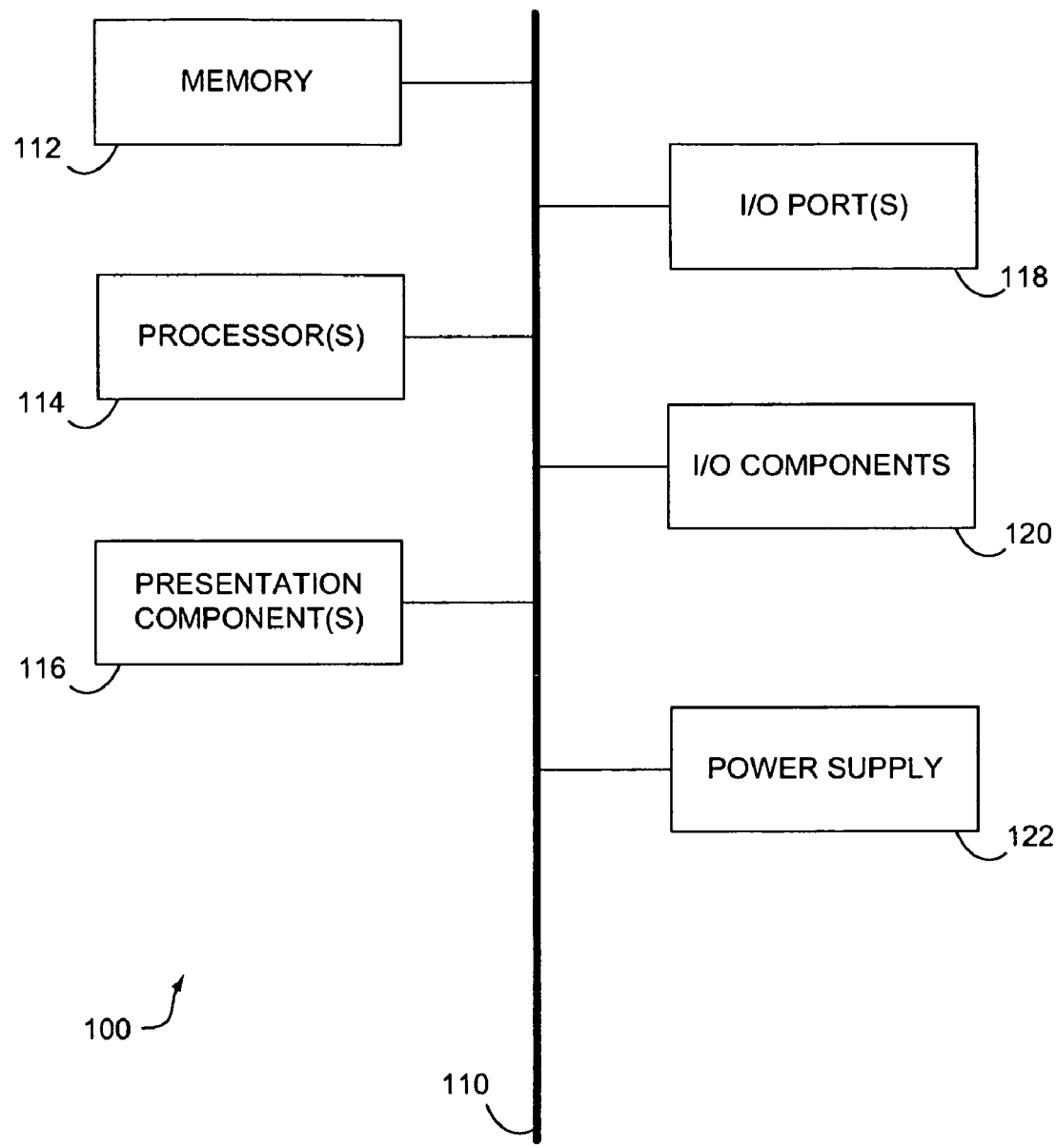
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Embodiments of the present invention relate to methods and computer-readable media for, among other things, summarizing the content of a plurality of documents (e.g., search result documents) and presenting the results of such multiple-document summarization to a user in such a way that the user is able to quickly and easily discern what, if any, unique information each document contains. Each sentence of each document is assigned a score based upon the perceived importance of the information contained therein. The sentences receiving the highest scores are then compared with one another to identify and remove any duplicate (or substantially duplicate) sentences. The remaining high-scoring sentences are then extracted from the corresponding documents and presented to the user, for instance, in a bulleted list format. The user can then simply scan the list and, because duplicate and substantially duplicate sentences have been removed from presentation consideration, can quickly and easily discern the unique information contained in each document. Alternatively or in addition, techniques may be utilized wherein sentences, bullet points, or the like are generated based upon content of the document pages and output as a summarization thereof.

Accordingly, in one embodiment, the present invention provides one or more computer-readable media having computer-executable instructions embodied thereon, that when executed, cause a computing device to perform a method of summarizing content of a plurality of documents and presenting results of such multiple-document summarization to a user. The method includes receiving a plurality of documents and concatenating the plurality of documents to create a document chain, the document chain including a plurality of sentences. A score is assigned to each of the plurality of sentences. A first pre-determined number of the plurality of sentences having the highest assigned scores is examined to identify duplicate sentences and any identified duplicate sentences are removed to create a preliminary sentence list. A second pre-determined number of sentences is extracted from the preliminary sentence list to create an extracted sentence list and each sentence from the extracted sentence list is presented to the user.

In another embodiment, the present invention provides a computer-implemented method that, when executed by a computing device, summarizes content of a plurality of search result documents and presents results of such multiple-search-result-document summarization to a user. The method includes receiving a search query, identifying a plurality of search result documents satisfying the received search query, and concatenating the search result documents to create a search result document chain. The search result document chain includes a plurality of sentences. Utilizing a first computing process, a score is assigned to each of the plurality of sentences. A first pre-determined number of the plurality of sentences having the highest assigned scores is examined to identify duplicate sentences and any identified duplicate sentences are removed to create a preliminary sentence list. Utilizing a second computing process, a second pre-determined number of sentences is extracted from the preliminary sentence list to create an extracted sentence list and each sentence from the extracted sentence list is presented to a user in a first area of a search results page, the first area being visually separated from a second area that presents results of the received search query. The first and second computing processes may be performed by one or more computing devices.

In yet another embodiment, the present invention provides one or more computer-readable media having computer-executable instructions embodied thereon, that when executed, cause a computing device to perform a method of summarizing content of a plurality of search result documents and presenting results of such multiple-search-result-document summarization to a user. The method includes receiving a news-related search query, identifying a plurality of articles satisfying the news-related search query, and concatenating the articles to create a search result document chain. The search result document chain includes a plurality of sentences. At least one feature vector is extracted from each of the plurality of sentences, each feature vector being indicative of a measure of importance of a feature associated therewith. A weight is applied to each extracted feature vector and a score is assigned to each of the plurality of sentences based upon a combined weight of the feature vectors extracted there from. A first pre-determined number of the plurality of sentences having the highest assigned scores is examined to identify duplicate sentences and any identified duplicate sentences are removed to create a preliminary sentence list. A second pre-determined number of sentences from the preliminary sentence list is extracted to create an extracted sentence list and each sentence from the extracted sentence list is presented in a first area of a search results page, the first area being visually separated from a second area that presents results of the received news-related search query.

Having briefly described an overview of embodiments of the present invention, an exemplary operating environment in which various aspects of the present invention may be implemented is now described. Referring to the drawings in general, and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including handheld devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

The computing device 100 typically includes a variety of computer-readable media. Computer-readable media can be any available media that can be accessed by the computing device 100 and includes both volatile and nonvolatile media, removable and non-removable media. By way of example, and not limitation, computer-readable media may comprise computer-storage media and communication media. Computer-storage media include both volatile and nonvolatile, removable and non-removable media implemented in any method or technology for storage of information such as computer-readable instructions, data structures, program modules or other data. Computer-storage media include, but are not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired information and which can be accessed by the computing device 100.

The memory 112 includes computer-storage media in the form of volatile and/or nonvolatile memory. The memory 112 may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 presents data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components 120 include a microphone, joystick, game pad, satellite dish, scanner, printer, wireless device, and the like.

Figure 2:
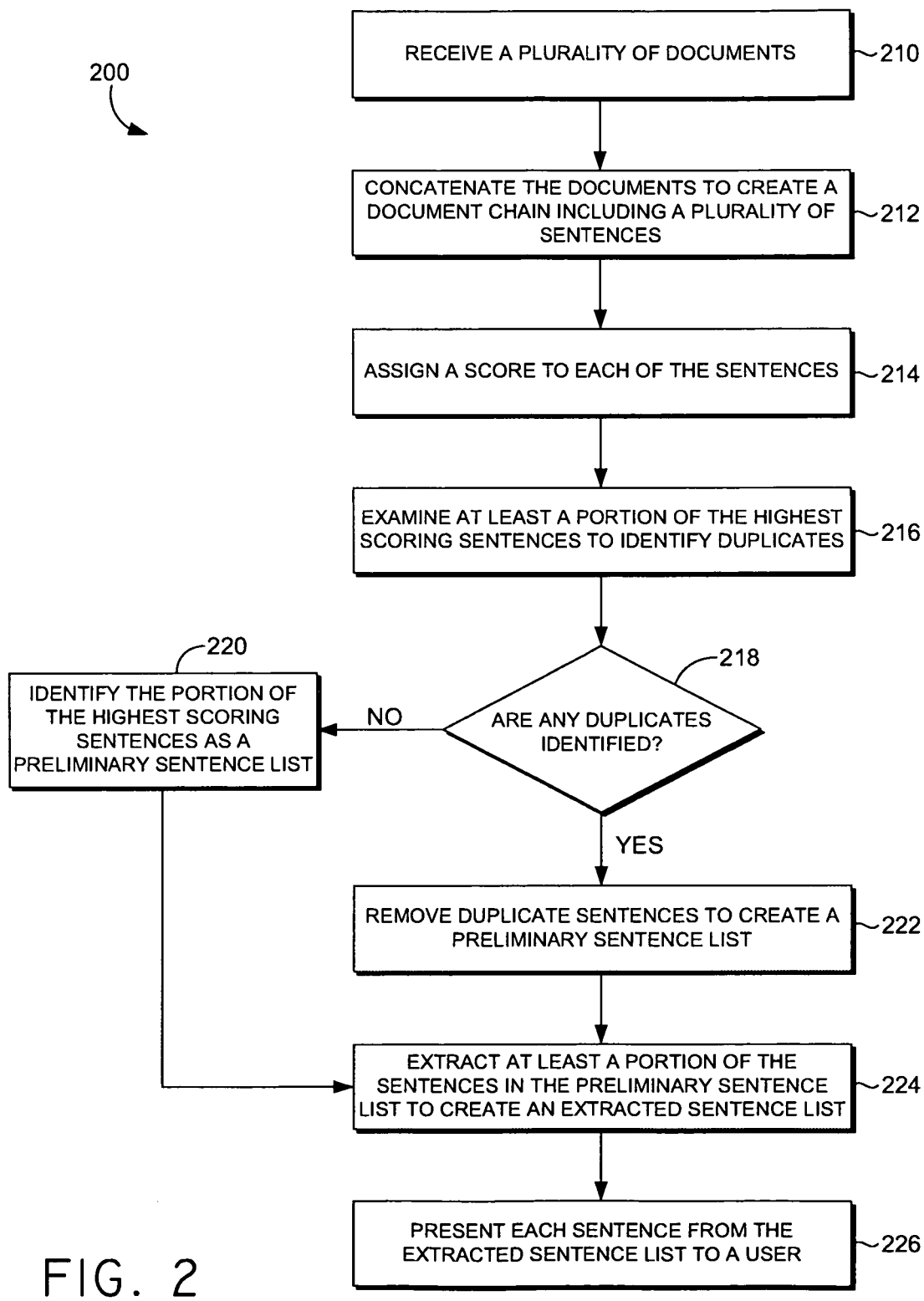
FIG. 2 is a flow diagram of a method for summarizing the content of a plurality of documents and presenting results of such multiple-document summarization to a user, in accordance with an embodiment of the present invention.

As previously stated, embodiments of the present invention relate to methods and computer-readable media for, among other things, summarizing the content of a plurality of documents (e.g., search result documents) and presenting the results of such multiple-document summarization to a user in such a way that a user is able to quickly and easily discern what, if any, unique information each document contains. With reference to FIG. 2, a flow diagram of such a method, in accordance with an embodiment of the present invention, is shown and designated generally as reference numeral 200. Initially, as indicated at block 210, a plurality of documents is received. In embodiments, such documents are at least similar to one another in that they each contain information related to a particular topic. For instance, the plurality of documents may be identified as the result of a search for articles about a particular news-worthy event, e.g., a large corporate merger or acquisition. In another embodiment, the plurality of documents may be associated with one another through use of a clustering algorithm applied independent of a search being conducted. Any and all such variations, and any combination thereof, are contemplated to be within the scope of embodiments of the present invention.

As indicated at block 212, each of the plurality of documents received is concatenated to create a document chain or series. Each of the plurality of documents contains one or more sentences and, as such, upon concatenation, the document chain includes a plurality of sentences. As indicated at block 214, a score is assigned to each of the plurality of sentences, the score being based upon the perceived importance of the information contained therein. One exemplary method of assigning a score to each of the plurality of sentences is described below with reference to FIG. 3.

At least a portion of the highest scoring sentences (for instance, a pre-determined number of high-scoring sentences) is then examined to identify any sentences that are exact and/or substantial duplicates of one another. This is indicated at block 216. For instance, the terms in the sentences may be compared and sentences having at least a predefined percentage of term overlap (e.g., 80% term overlap) may be identified as duplicates or substantial duplicates of one another. As indicated at block 218, it is then determined if any duplicate (or substantially duplicate) sentences have been identified. If no duplicate sentences are identified, the portion of the highest scoring sentences that was examined is identified as a preliminary sentence list. This is indicated at block 220. If, however, one or more duplicate sentences are identified in the examined portion of the highest scoring sentences, duplicate sentences are removed and the sentences that remain are identified as the preliminary sentence list. This is indicated at block 222.

In an embodiment of the present invention, removal of the duplicate sentences indicates that only a single sentence containing the duplicate information is retained in the preliminary sentence list. That is, if three documents are identified as containing the exact same sentence, the sentence from one of the three documents will be retained but the sentence from the other two of the three documents will be removed. In this way, important information is not completely removed from the preliminary sentence list but rather information that imparts little or no additional value with respect to information already contained in the preliminary sentence list is removed. From which of the documents containing duplicate or substantially duplicate sentences a particular sentence is retained may be determined in any number of ways within the scope of embodiments hereof. For instance, by way of example only, if the documents were identified as the result of a user-input search query, the document having the highest ranking based upon the search result algorithm may be selected as the document from which the duplicate sentence will be retained.

At least a portion of the sentences in the preliminary sentence list are then extracted from their corresponding documents to create an extracted sentence list, as indicated at block 224. The number of extracted sentences is generally predefined and limited by the number of sentences desired to be presented to the user. Each sentence from the extracted sentence list is then presented to the user, as indicated at block 226. The user can then simply scan the presented sentences and, because duplicate and substantially duplicate sentences have been removed, can quickly and easily discern the unique information contained in each document. In an embodiment, the extracted sentences are presented in a bulleted list format. One exemplary way in which the extracted sentences may be presented in such a format is described below with reference to FIG. 5. In other embodiments, other styles of presentation (not shown) may be utilized. For instance, and by way of example only, summarizations may be presented as a paragraph abstract of the document or only the key entities from the extracted sentences may be presented rather than the entire sentences (or sentence simplifications or generated sentences or bullet points, as more fully described below). Any and all such variations, and any combination thereof, are contemplated to be within the scope of embodiments of the present invention.

In embodiments, an indicator of the source of each presented sentence is correspondingly presented with the sentence. The indicator may be a web page address or any other alpha-numeric symbol designation that may be utilized to identify the sentence source. In this way, the user cannot only quickly and easily discern unique and important information, but can also readily identify the source of that information. Thus, if he or she desires to obtain additional information related to the extracted information, he or she may directly access the source of the information. In one embodiment, the presented indicator is a selectable link, selection of which navigates the user to the sentence source.

It is within the scope of embodiments of the present invention that a sentence simplification model may be utilized and applied to the extracted sentences so that a simplified version of one or more of the extracted sentences is presented rather than the entire extracted sentence itself. Sentence simplification models are generally known to those of ordinary skill in the art and, accordingly, are not further described herein. Additionally, it is within the scope of embodiments of the present invention that multiple-document summarization may be performed by methods other than sentence scoring and extraction. For instance, techniques may be utilized wherein sentences, bullet points, or the like are generated based upon content of the document pages and output as a summarization thereof. Any and all such variations, and any combinations thereof, are contemplated to be within the scope of embodiments hereof.

In embodiments, the generated summarizations may be enhanced with other media pulled from the document chain. For instance, exclusive photographs or other media unique to a particular document in the chain may be utilized to enhance the summarization rather than merely text presentation. Any and all such variations, and any combinations thereof, are contemplated to be within the scope of embodiments of the present invention.

Figure 3:
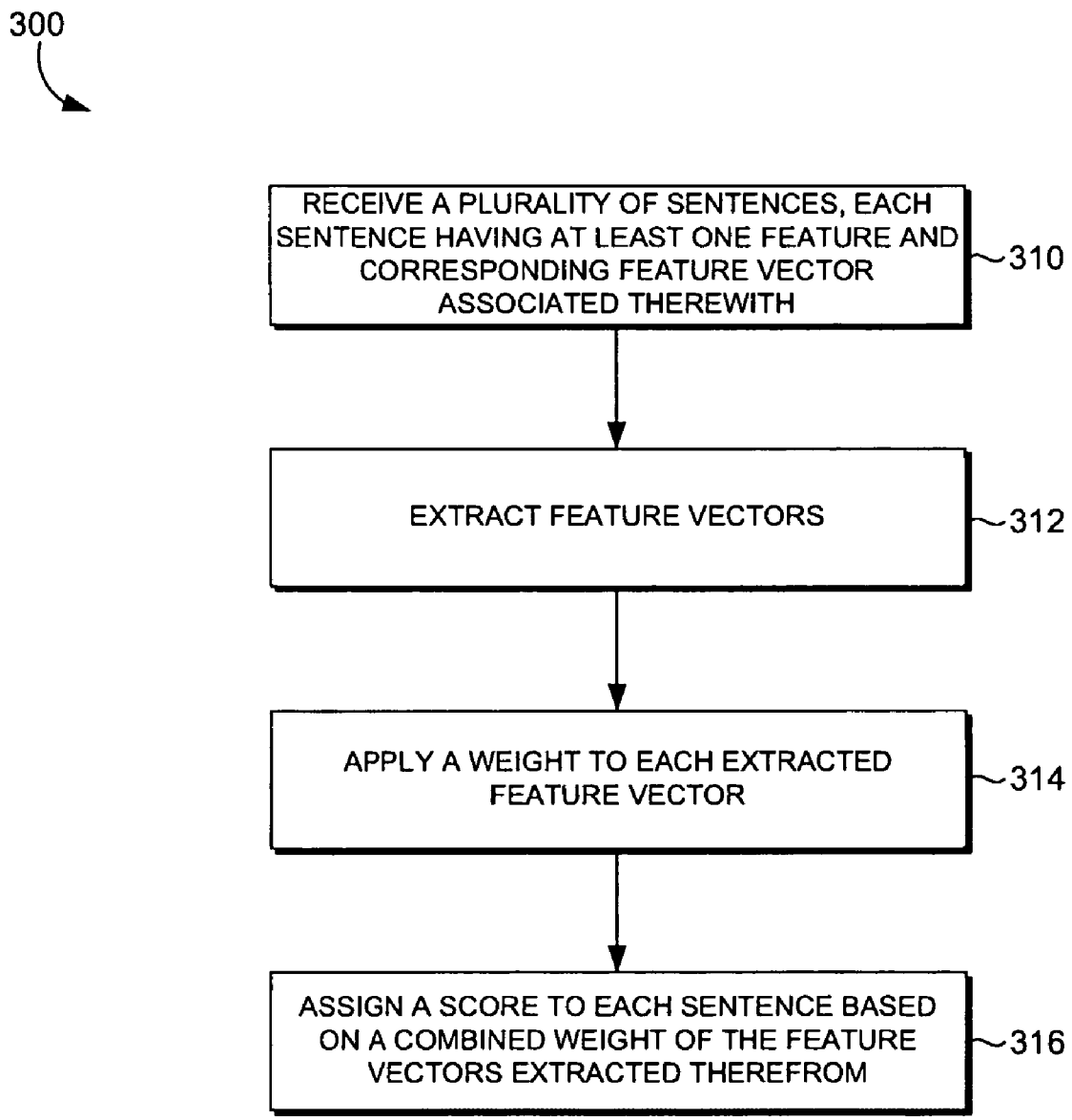
FIG. 3 is a flow diagram of a method for assigning a score to each of a plurality of sentences using a neural network ranking algorithm and third-party datasets to enhance sentence features, in accordance with an embodiment of the present invention.

With reference now to FIG. 3, an exemplary method for assigning a score to each of a plurality of sentences, in accordance with an embodiment of the present invention, is shown and designated generally as reference numeral 300. The method 300 shown in FIG. 3 assigns sentence scores using a neural network ranking algorithm and third-party datasets to enhance sentence features (as more fully described below). It will be understood and appreciated by those of ordinary skill in the art that the method of FIG. 3 is merely exemplary and that any method for assigning scores to document sentences (whether utilizing statistical features, semantic features, or a combination thereof), the scores being based upon the perceived importance of the information contained in the scored sentences, may be utilized within the scope of embodiments of the present invention.

Initially, as indicated at block 310, a plurality of sentences is received. In embodiments, such sentences are representative of a plurality of concatenated documents (e.g., search result documents) as described herein above with respect to FIG. 2. Each sentence in the plurality has at least one feature and a corresponding feature vector associated therewith. Each feature vector is indicative of a measure of the importance of the associated feature. Exemplary features include, without limitation, sentence position (e.g., the first sentence of a document is considered especially important), terms common with the title (e.g., title similarity score), appearance of keyword terms, and word frequency (e.g., SumBasic Score and SumBasic Bigram Score). In one embodiment, at least one of the features is a measure of how often a term in the associated sentence appears in one or more query logs (e.g., an Average News Query Term Score, News Query Term Sum Score, or Relative News Query Term Score). In one embodiment, at least one of the features is a measure of how often a term in the associated sentence appears in a title of an online encyclopedia page or entity, for instance, a Wikipedia page (e.g., Average Wikipedia Entity Score or Wikipedia Entity Sum Score). A more complete explanation of features and their use in ranking sentence importance, in accordance with embodiments hereof, is provided in Svore, K. M., Vanderwende, L. and Burges, C. J. C., *Enhancing Single-document Summarization by Combining RankNet and Third-party Sources*, EMNLP-CoNLL '07: Proceedings of the 2007 Joint Conference on Empirical Methods in Natural Language Processing and Computational Natural Language Learning, Prague, CZ, 2007, which is incorporated herein by reference in its entirety.

As indicated at block 312, the feature vectors are extracted from the plurality of sentences. A weight is then applied to each extracted feature vector, as indicated at block 314. A score is assigned to each sentence based upon a combined weight of the feature vectors extracted there from. This is indicated at block 316.

Figure 4:
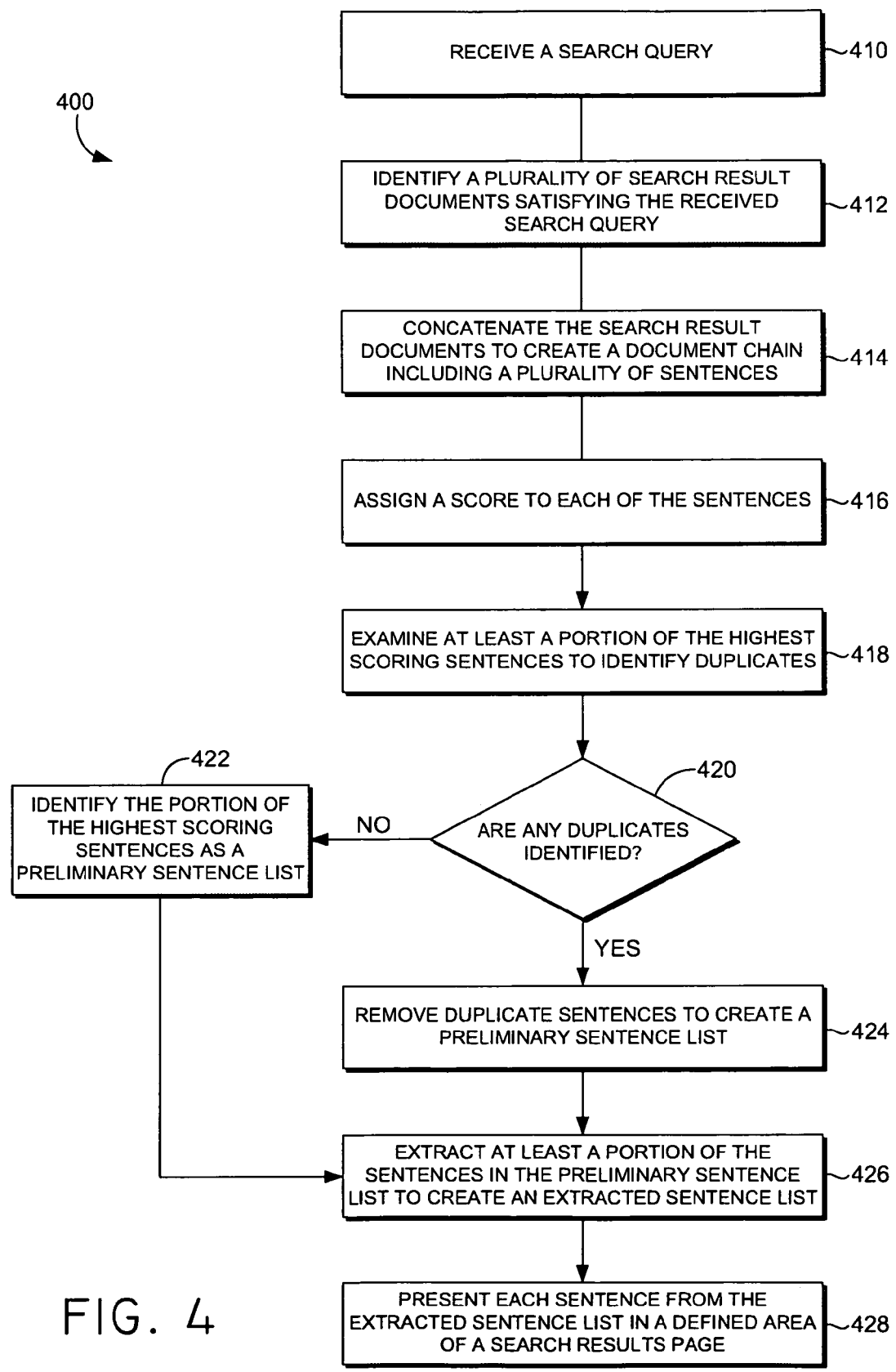
FIG. 4 is a flow diagram of a method for summarizing the content of a plurality of search result documents and presenting results of such multiple-search-result-document summarization in a defined area of a search results page, in accordance with an embodiment of the present invention.

With reference now to FIG. 4, a flow diagram is illustrated showing a method 400 for summarizing the content of a plurality of search result documents and presenting results of such multiple-search-result-document summarization in a defined area of a search results page, in accordance with an embodiment of the present invention. Initially, as indicated at a block 410, a search query is received. For instance, a search query input by a user may be received by a search engine. In embodiments, the received search query is a news-related search query. A plurality of search result documents that satisfies the received search query is then identified, as indicated at block 412. Generally, as each identified search result has been determined to satisfy or otherwise be related to the same input search query, each identified search result will be related to, or contain information about, a particular topic. As such, it is probable that duplicate information will be contained within the identified search results. In the example where the received search query is a news-related search query, the identified search result documents that satisfy the received search query include a plurality of news articles related to the news-related search query. In this instance in particular, it is probable that not only will duplicate information be contained in the identified search results but that some of the search results will contain exactly the same information, for instance, that some of the search results will be copies of articles syndicated from a single source.

As indicated at block 414, the identified search result documents are concatenated to create a search result document chain or series. Each of the plurality of search result documents contains one or more sentences and, as such, upon concatenation, the search result document chain includes a plurality of sentences. As indicated at block 416, a score is assigned to each of the plurality of sentences (via a first computing process), the score being based upon the perceived importance of the information contained therein. One exemplary method of assigning a score to each of the plurality of sentences was described herein above with reference to FIG. 3.

At least a portion of the highest scoring sentences (for instance, a pre-determined number of high-scoring sentences) is then examined to identify any sentences that are exact and/or substantial duplicates of one another. This is indicated at block 418. As indicated at block 420, it is then determined if any duplicate or substantially duplicate sentences have been identified. If no duplicate sentences are identified, the portion of the highest scoring sentences that was examined is identified as a preliminary sentence list. This is indicated at block 422. If, however, one or more duplicate sentences are identified in the examined portion of the highest scoring sentences, duplicate sentences are removed and the sentences that remain are identified as the preliminary sentence list. This is indicated at block 424. As previously described with reference to FIG. 2, in embodiments, removal of the duplicate sentences indicates that only a single sentence containing the duplicate information is retained in the preliminary sentence list so that important information is not completely removed from the preliminary sentence list but rather information that imparts little or no additional value with respect to information already contained in the preliminary sentence list is removed.

At least a portion of the sentences in the preliminary sentence list are then extracted from their corresponding search result documents (utilizing a second computing process) to create an extracted sentence list, as indicated at block 426. Each sentence from the extracted sentence list is then presented in a defined area of a search results page, as indicated at block 428. One exemplary way in which the extracted sentences may be presented in a defined area of a search results page is illustrated in FIG. 5.

Figure 5:
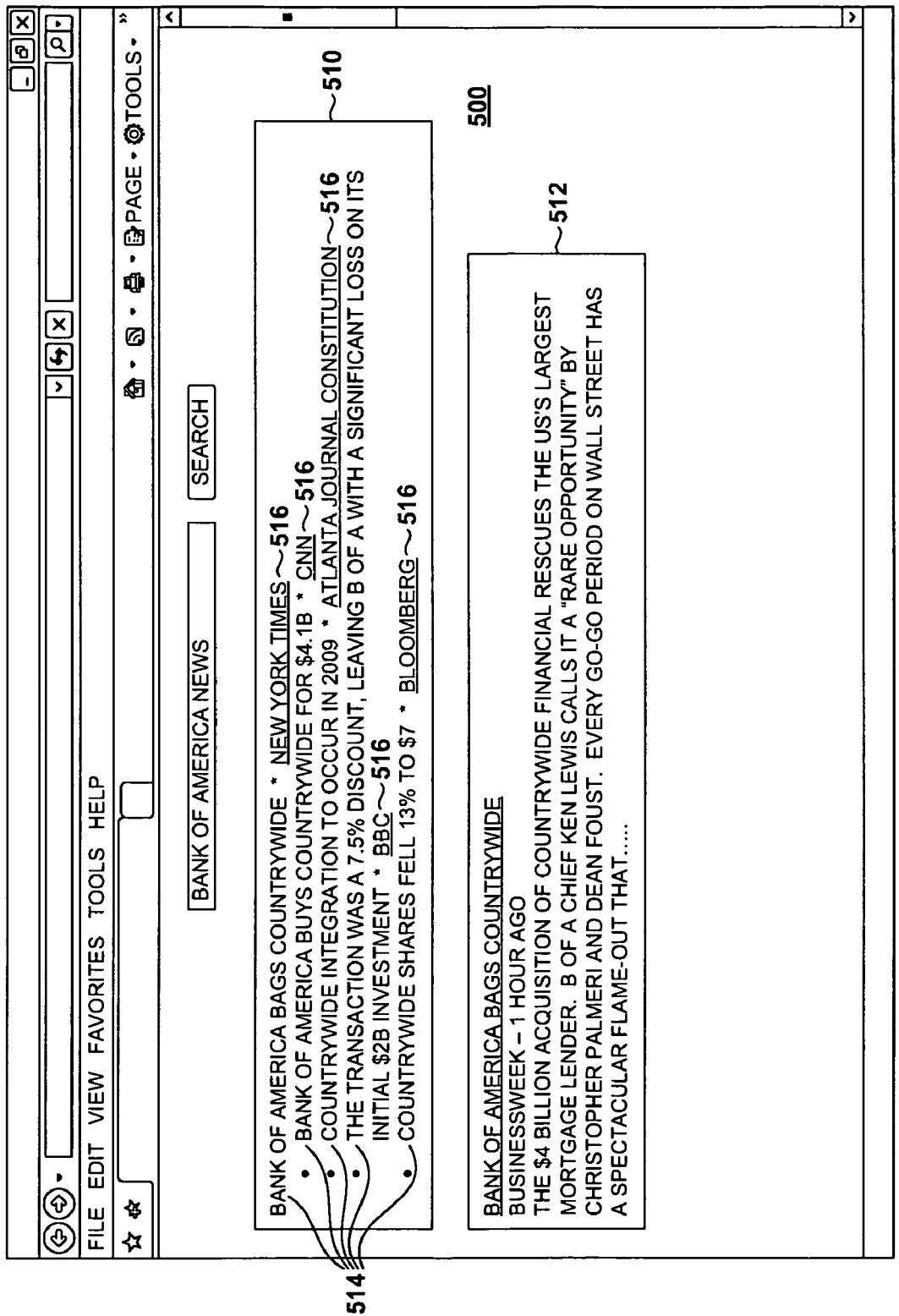
FIG. 5 is an illustrative screen display of a search results page having a defined area for presentation of multiple-search-result-document summarization, in accordance with an embodiment of the present invention.

FIG. 5 is an illustrative screen display of a search results page 500 having a first, defined area 510 for presentation of multiple-search-result-document summarization, in accordance with an embodiment of the present invention. The multiple-search-result-document summarization area 510 is visually separated from a second display area 512 configured for presentation of traditional search results, that is, the results identified as satisfying an input search query according to one or more search result ranking algorithms. The multiple-search-result-document summarization area 510 shown in FIG. 5 includes a plurality of extracted sentences 514 (or simplified sentences), each being associated with an indicator 516 of the source of the information contained in the sentence. In the illustrated embodiment, each indicator 516 represents a selectable link, selection of which will cause the user to navigate to the sentence source. As can be seen, each of the extracted sentences imparts information about the queried topic ("Bank of America News" in the illustrated example) that is different from the information imparted from any of the other extracted sentences. In this way, a user may scan the extracted sentences and have a relatively comprehensive understanding of a number of different facets related to the queried topic. Additionally, if the user had something particular in mind that he or she wanted to learn about the queried topic, he or she would be able to readily discern which sentence source is most likely to include the desired information.

In embodiments, common query refinements may be utilized to identify search result documents satisfying input search queries. That is, if one or more common query refinements are identified for an input search query, search result documents satisfying the refined search queries may be identified instead of or in addition to, documents that satisfy the search query according to traditional search ranking algorithms. In embodiments, such query refinements may be utilized, at least in part, to identify those sentences from the search result documents that will be extracted and presented. For instance, for an input query of "Britney Spears," common query refinements may be "Britney Spears Tour" and "Britney Spears Gossip." In identifying sentences for extraction and presentation, at least one sentence from a document describing Britney Spears tour schedule and one sentence from a document describing the latest gossip about Britney Spears may be selected for presentation. Thus, the user may be able to readily discern which documents contain the information he or she was really searching for without having to issue the refined query. In embodiments, such query refinements may be represented as feature vectors and weighted in conjunction with other extracted feature vectors in determining the importance of a sentence.

Figure 6:
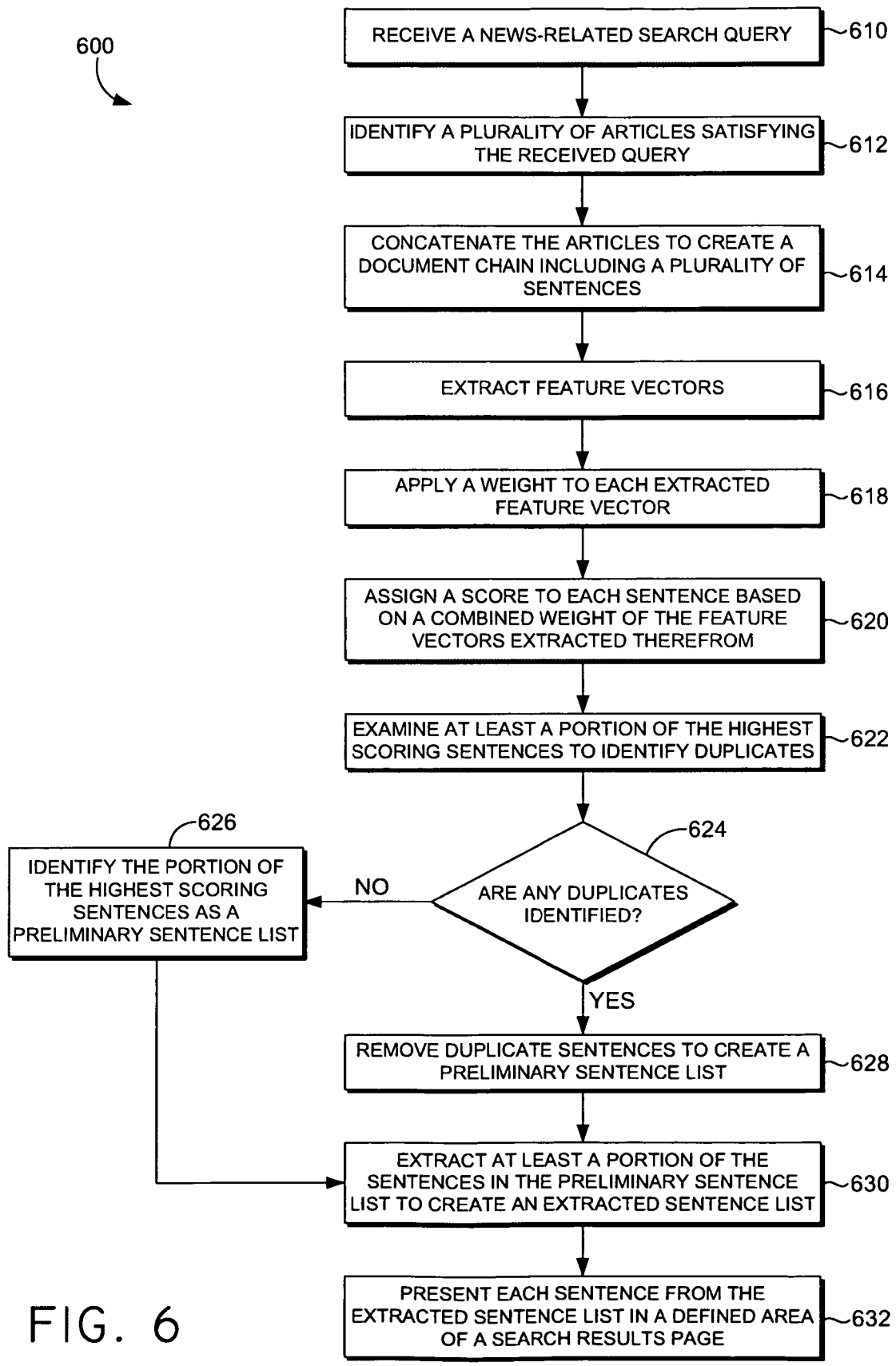
FIG. 6 is a flow diagram of a method for summarizing the content of a plurality of search result documents and presenting results of such multiple-search-result-document summarization in a defined area of a search results page, in accordance with an embodiment of the present invention.

Turning now to FIG. 6, a flow diagram is illustrated showing of a method 600 for summarizing the content of a plurality of search result documents and presenting results of such multiple-search-result-document summarization in a defined area of a search results page, in accordance with an embodiment of the present invention. Initially, as indicated at block 610, a news-related search query is received. A plurality of articles satisfying the received news-related search query is then identified, as indicated at block 612. Each of the plurality of articles satisfying the received news-related search query is concatenated to create an article document chain. This is indicated at block 614. Each of the plurality of articles contains one or more sentences and, as such, upon concatenation, the article document chain includes a plurality of sentences.

As indicated at block 616, at least one feature vector is extracted from each of the plurality of sentences. Each feature vector is indicative of a measure of importance of the feature associated therewith. A weight is then applied to each extracted feature vector, as indicated at block 618. A score is assigned to each of the plurality of sentences based upon a combined weight of the feature vectors extracted there from. This is indicated at block 620.

At least a portion of the highest scoring sentences (for instance, a pre-determined number of high-scoring sentences) is then examined to identify any sentences that are exact and/or substantial duplicates of one another. This is indicated at block 622. As indicated at block 624, it is then determined if any duplicate or substantially duplicate sentences have been identified. If no duplicate sentences are identified, the portion of the highest scoring sentences that was examined is identified as a preliminary sentence list. This is indicated at block 626. If, however, one or more duplicate sentences are identified in the examined portion of the highest scoring sentences, duplicate sentences are removed and the sentences that remain are identified as the preliminary sentence list. This is indicated at block 628. As previously described with reference to FIG. 2, in embodiments, removal of the duplicate sentences indicates that only a single sentence containing the duplicate information is retained in the preliminary sentence list so that important information is not completely removed from the preliminary sentence list but rather information that imparts little or no additional value with respect to information already contained in the preliminary sentence list is removed.

At least a portion of the sentences in the preliminary sentence list are then extracted from their corresponding articles to create an extracted sentence list, as indicated at block 630. Each sentence from the extracted sentence list is then presented in a defined area of a search results page, as indicated at block 632. One exemplary way in which the extracted sentences may be presented in a defined area of a search results page is illustrated in FIG. 5 described herein above.

As can be seen, embodiments of the present invention relate to methods and computer-readable media for, among other things, summarizing the content of a plurality of documents (e.g., search result documents) and presenting the results of such multiple-document summarization to a user in such a way that a user is able to quickly and easily discern what, if any, unique information each document contains. The foregoing descriptions of embodiments of the invention are illustrative, and modifications in configuration and implementation will occur to persons skilled in the art. For instance, while the present invention has generally been described with relation to FIGS. 1-6, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

What is claimed is:

1. One or more computer-readable media having computer-executable instructions embodied thereon, that when executed, cause a computing device to perform a method of summarizing content of a plurality of documents and presenting results of such multiple-document summarization to a user, the method comprising:

receiving the plurality of documents in response to a search query;

concatenating the plurality of documents to create a document chain, the document chain including a plurality of sentences;

assigning a score to each of the plurality of sentences;

examining a first pre-determined number of the plurality of sentences having the highest assigned scores to identify duplicate sentences;

removing any identified duplicate sentences to create a preliminary sentence list;

extracting a second pre-determined number of sentences from the preliminary sentence list to create an extracted sentence list, each sentence in the extracted sentence list corresponding to a single document of the plurality of documents, the each sentence representing a summary of the each sentence's associated document; and presenting separately each sentence from the extracted sentence list in association with an indicator of a source of the each sentence in a first area of a search results page, the first area being visually separated from a second area of the search results page, the second area presenting algorithmic search results associated with the search query.

2. The one or more computer-readable media of claim 1, wherein each of the plurality of sentences includes one or more features associated therewith, each of the one or more features having a corresponding feature vector, and wherein assigning a score to each of the plurality of sentences includes:
- extracting at least one of the feature vectors from each of the plurality of sentences, each feature vector being indicative of a measure of importance of the associated feature;
- applying a weight to each extracted feature vector; and
- assigning the score to each of the plurality of sentences based upon a combined weight of the feature vectors extracted there from.

3. The one or more computer-readable media of claim 2, wherein at least one of the one or more features is a measure of how often a term in the associated sentence appears in one or more query logs.

4. The one or more computer-readable media of claim 2, wherein at least one of the one or more features is a measure of how often a term in the associated sentence appears in a title of an online encyclopedia page.

5. The one or more computer-readable media of claim 1, wherein presenting each sentence from the extracted sentence list to the user comprises presenting each sentence from the extracted sentence list along with an indicator of the source of each sentence.

6. The one or more computer-readable media of claim 5, wherein the indicator of the source of each sentence comprises a selectable link, selection of which navigates the user to the sentence source.

7. The one or more computer-readable media of claim 1, wherein presenting each sentence from the extracted sentence list to the user comprises presenting each sentence from the extracted sentence list in a bulleted list format.

8. The one or more computer-readable media of claim 1, wherein the method further comprises applying a sentence simplification model to each sentence in the extracted sentence list to create a simplified, extracted sentence list, and wherein presenting each sentence from the extracted sentence list to the user comprises presenting each sentence from the simplified, extracted sentence list to the user.

9. A computer-implemented method that, when executed by a computing device, summarizes content of a plurality of search result documents and presents results of such multiple-search-result-document summarization to a user, the method comprising:
- receiving a search query;
- identifying at least one common query refinement for the received search query;
- identifying a first plurality of search result documents satisfying the received search query;
- identifying a second plurality of search result documents satisfying the at least one common query refinement;
- concatenating the first and the second plurality of search result documents to create a search result document chain, the search result document chain including a plurality of sentences;
- utilizing a first computing process, assigning a score to each of the plurality of sentences, wherein a sentence from the second plurality of search result documents is scored differently than a sentence from the first plurality of search result documents;
- examining a first pre-determined number of the plurality of sentences having the highest assigned scores to identify duplicate sentences;
- removing any identified duplicate sentences to create a preliminary sentence list;
- utilizing a second computing process, extracting a second pre-determined number of sentences from the preliminary sentence list to create an extracted sentence list, each sentence in the extracted sentence list corresponding to a single document, the each sentence representing a summary of the each sentence's associated document, wherein the second pre-determined number of sentences includes at least a sentence from the first plurality of search result documents and at least a sentence from the second plurality of search result documents; and
- presenting separately each sentence from the extracted sentence list in association with an indicator of a source of the each sentence in a first area of a search results page, the first area being visually separated from a second area that presents algorithmic search results associated with the received search query,
  - wherein the each indicator is a selectable link, and wherein selection of the each indicator navigates a user to the source of the associated each sentence, and wherein the first and second computing processes are performed by one or more computing devices.

10. The computer-implemented method of claim 9, wherein receiving the search query comprises receiving a news-related search query, and wherein identifying the plurality of search result documents satisfying the received search query comprises identifying a plurality of articles satisfying the news-related search query.

11. The computer-implemented method of claim 9, wherein identifying the at least one common query refinement for the received search query comprises identifying a plurality of common query refinements for the received search query, and wherein identifying the plurality of search result documents satisfying the refined search query comprises identifying at least one search result document satisfying each of the plurality of common refined queries.

12. The computer-implemented method of claim 9, wherein each of the plurality of sentences includes one or more features associated therewith, each of the one or more features having a corresponding feature vector, and wherein assigning a score to each of the plurality of sentences includes:
- extracting at least one of the feature vectors from each of the plurality of sentences, each feature vector being indicative of a measure of importance of the associated feature;
- applying a weight to each extracted feature vector; and
- assigning the score to each of the plurality of sentences based upon a combined weight of the feature vectors extracted there from.

13. The computer-implemented method of claim 12, wherein at least one of the one or more features is a measure of how often a term in the associated sentence appears in one or more query logs.

14. The computer-implemented method of claim 12, wherein at least one of the one or more features is a measure of how often a term in the associated sentence appears in a title on an online encyclopedia page.

15. The computer-implemented method of claim 9, wherein presenting each sentence from the extracted sentence list in the first area of the search results page comprises presenting each sentence from the extracted sentence list in a bulleted list format in the first area of the search results page.

16. The computer-implemented method of claim 9, further comprising applying a sentence simplification model to each sentence in the extracted sentence list to create a simplified, extracted sentence list, wherein presenting each sentence from the extracted sentence list in the first area of the search results page comprises presenting each sentence from the simplified, extracted sentence list in the first area of the search results page.

17. One or more computer-readable media having computer-executable instructions embodied thereon, that when executed, cause a computing device to perform a method of summarizing content of a plurality of search result documents and presenting results of such multiple-search-result-document summarization to a user, the method comprising:
receiving a news-related search query;
identifying a plurality of articles satisfying the news-related search query, wherein the plurality of articles are in a ranking order based on a search result algorithm;
concatenating the plurality of articles to create a search result document chain, the search result document chain including a plurality of sentences;
extracting at least one feature vector from each of the plurality of sentences, each feature vector being indicative of a measure of importance of a feature associated therewith;
applying a weight to each extracted feature vector;
assigning a score to each of the plurality of sentences based upon a combined weight of the feature vectors extracted there from;
examining a first pre-determined number of the plurality of sentences having the highest assigned scores to identify duplicate sentences;
removing any identified duplicate sentences to create a preliminary sentence list such that a duplicate sentence from an article having a higher ranking based upon the search result algorithm is selected as the duplicate sentence to be retained;
extracting a second pre-determined number of sentences from the preliminary sentence list to create an extracted sentence list, each sentence in the extracted sentence list associated with a different article of the plurality of articles, the each sentence representing a summary of the each sentence's associated article; and
presenting separately each sentence from the extracted sentence list in a list format in a first area of a search results page, the first area being visually separated from a second area that presents results of the received news-related search query.

18. The one or more computer-readable media of claim 17, wherein presenting each sentence from the extracted sentence list in the first area of the search results page comprises presenting each sentence from the extracted sentence list in a bulleted list format in the first area of the search results page along with an indicator of the source of each sentence, and wherein the indicator of the source of each sentence comprises a selectable link, selection of which navigates the user to the sentence source.

* * * * *